March 1, 1932. C. HALL 1,847,511
VEHICLE BRAKE TESTING APPLIANCE
Filed Feb. 17, 1931 3 Sheets-Sheet 2
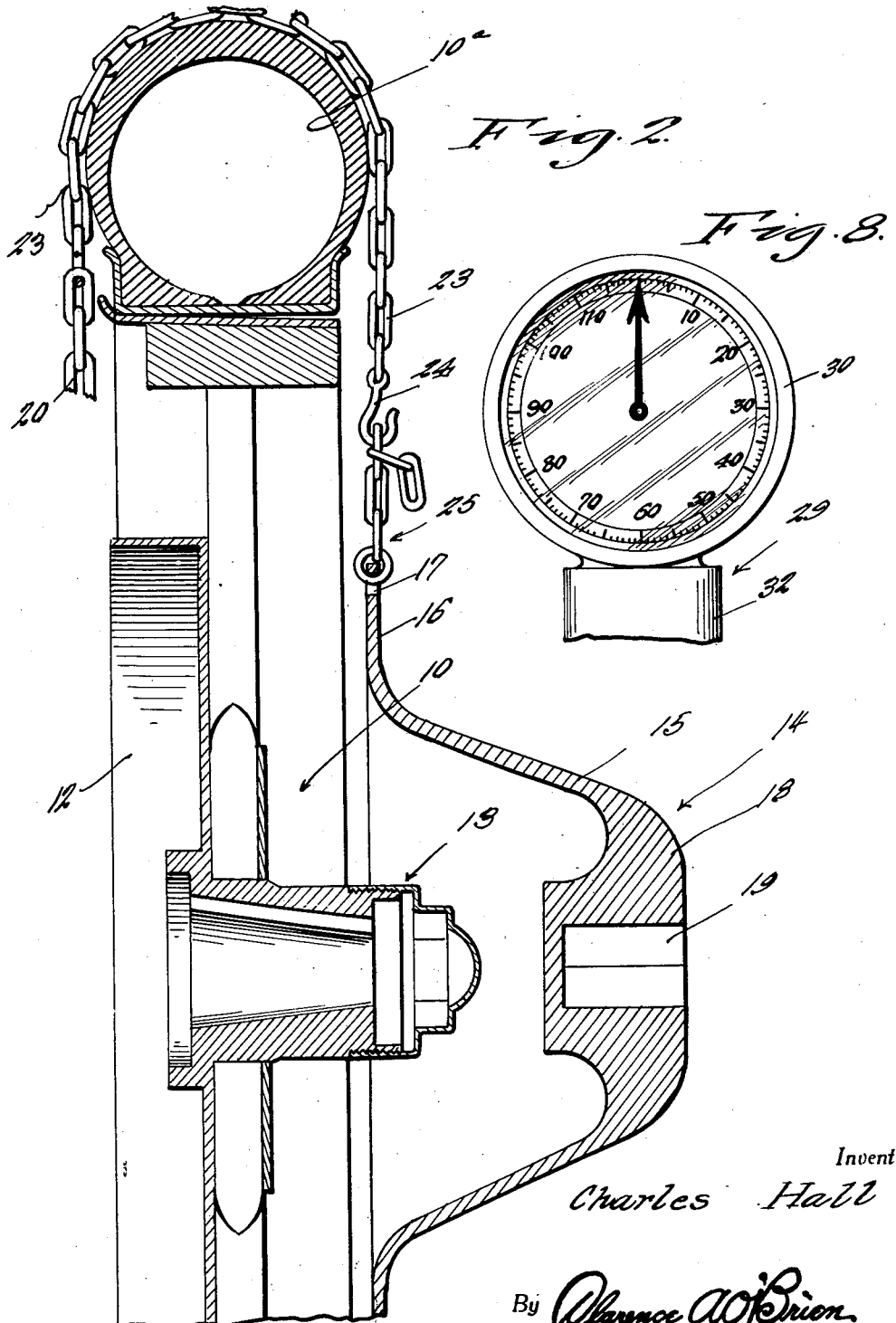

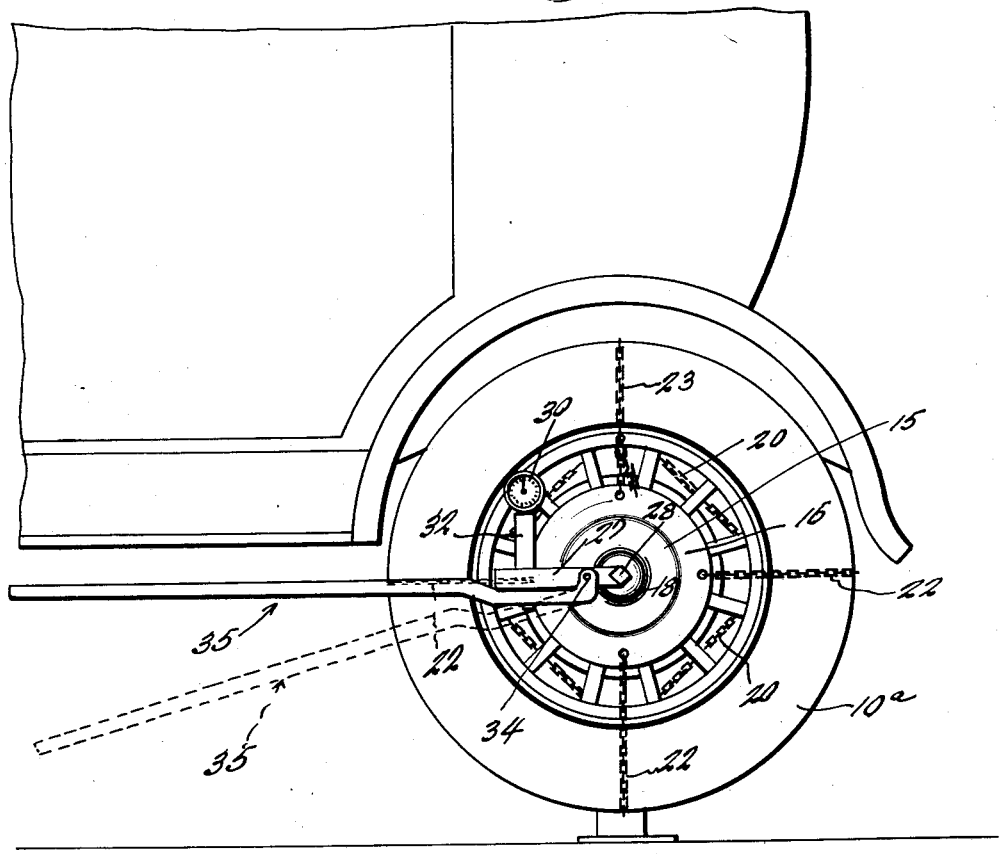

March 1, 1932.  C. HALL  1,847,511
VEHICLE BRAKE TESTING APPLIANCE
Filed Feb. 17, 1931  3 Sheets-Sheet 3
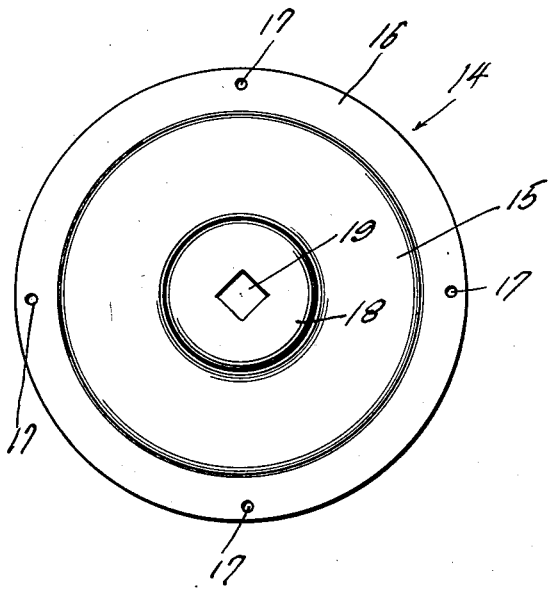
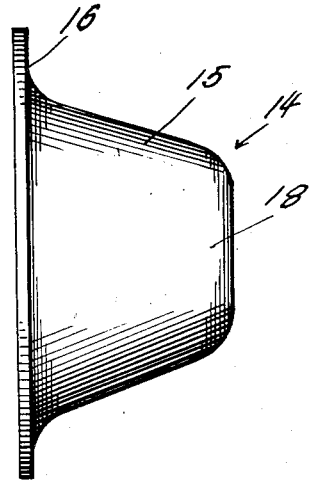
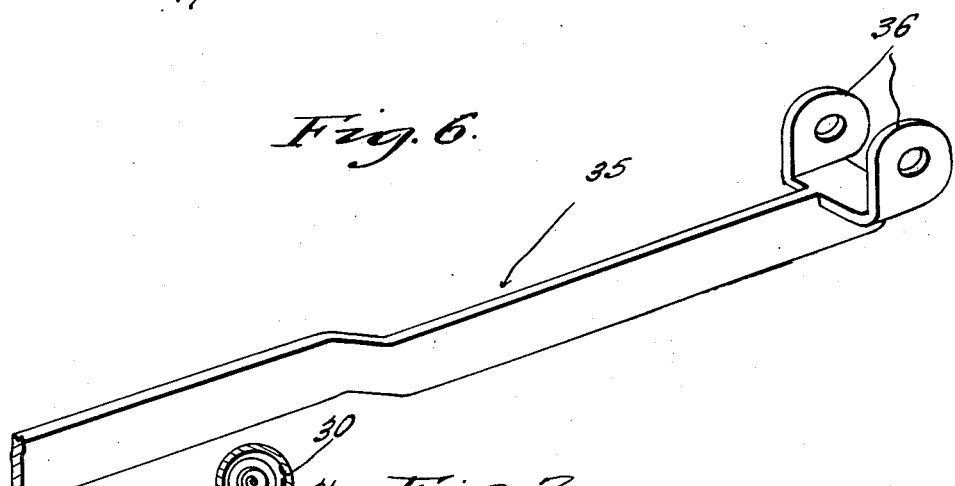
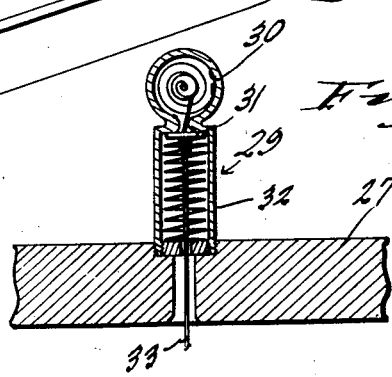
Inventor
Charles Hall
By Clarence A. O'Brien
Attorney Patented Mar. 1, 1932

1,847,511

UNITED STATES PATENT OFFICE

CHARLES HALL, OF COBLESKILL, NEW YORK

VEHICLE BRAKE TESTING APPLIANCE

Application filed February 17, 1931. Serial No. 516,465.

This invention relates to an improved automotive appliance which may be generally referred to as a brake tester susceptible of use in testing either mechanical or fluid brakes. More specifically stated, the inventive conception comprehends a device which is applicable to the wheel when the wheel is jacked up so as to accurately measure the pressure necessary to turn the wheel while the brake pedal is applied, thus permitting the appliance, when in the hands of a practical mechanic to be accurately tested for subsequent tightening and adjustment.

Briefly stated, the structure comprises a harness which may be applied to the wheel, said harness including a part to accommodate a wheel turning wrench and the wrench being of a duplex type and including a pressure gauge whose readings determine pressure necessary to rotate the wheel and in this way permit accurate checking of all of the wheels on the vehicle one with respect to the other for systematic and sensitive adjustment.

More explicitly recited, the so-called harness is characterized by a multiplicity of chains which securely embrace the tire and wheel, said chains being anchored on a hub shield, said shield being pocketed to accommodate the wheel turning and gauging wrench.

Novelty is predicated upon this particular harness construction and the duplex simplified gauge equipped wrench.

In the drawings:

Figure 1 is a side elevational view of a vehicle wheel with the appliance mounted thereon for usage, the wheel being shown as jacked up.

Figure 2 is an enlarged fragmentary sectional and elevational view of the wrench removed.

Figure 3 is a side elevation of the hub shield.

Figure 4 is an edge elevation of the same shield shown in Figure 3.

Figure 5 is a top plan view of the gauging and turning wrench.

Figure 6 is a perspective view of the turning lever of the wrench.

Figure 7 is detail view on the line 7—7 of Figure 5.

Figure 8 is a fragmentary elevational view of the gauge.

Figure 9 is an inside elevational view of the vehicle wheel showing the inner chain ensemble.

In Figure 2, the wheel, which is conventional, is designated by the numberal 10, the tire is indicated at 10, the brake drum at 12, and the hub cap and hub structure at 13.

In accordance with the present invention, I provide a wrench attaching device which is fastened to the wheel and the device is generally denoted by the numeral 14 and is here shown in the form of a substantially bell-shaped plate. This includes a body portion 15 which is shaped to embrace but not touch the hub, thus permitting the device to serve as a shield.

There is a marginal flange at 16 having a plurality of apertures 17. The central portion of the body is thickened in proportion as indicated at 18 and provided with a polygonal wrench socket 19. This device 14 constitutes the salient part of the so-called harness. The remainder of the harness is made up of a plurality of chains resembling an ordinary anti-skid chain construction.

For example, as shown in Figure 9, the inside chains are represented by the numeral 20 and are joined together by a hook 21 so that they assume a somewhat rectangular layout.

Attached to these are three tread chains indicated by the numerals 22, these having their outer ends fastened permanently to the holes or apertures 17 in the flange 16. The remaining tread chains distinguished by the reference character 23 occupy the position shown in Figure 2 and terminate in a hook 24 to permit it to be adjustably connected with the links of the short connecting chain 25. This permits secure anchorage of the chains on the tire and also insures proper maintenance of the device 14 so that the entire structure thus saddled on the wheel will bind sufficiently to cause the wheel to turn therewith.

This turning is accomplished through the medium of the special wrench which is generally designated by the numeral 26. This wrench comprises a T-shaped member having a shank 27 and right-angularly disposed polygonal portions 28 which may be selectively inserted into the socket 19 as shown in Figure 1.

Mounted on the shank 27 as shown in shown in Figure 7 is a gauge 29 having a dial casing 30 with suitable indicating means and a housing 31 to accommodate the internal pressure spring 32. This spring has a connecting and operating rod 33 connected therewith and also connected with the adjacent end portion 34 of the operating lever 35.

It will be observed that the inner end of this lever is provided with attaching ears 36 which straddle and are pivotally connected with the shank 27 at a point adjacent the head 28.

In operation, the wheel turning harness is applied to the wheel by assembling the chains over the tire somewhat in the same manner as applying anti-skid chains. The cup-like or bell-shaped socket device 14 is applied on the outside of the wheel and in spaced relation to the hub structure. Then either of the ends 28 of the head of the wrench 26 is slipped into the socket 19. This couples the wrench to the plate device 14 for rotating said device.

The operator catches hold of the lever 35 moving it downwardly until it assumes the dotted line position shown in Figure 1. At a predetermined time and when the requisite pressure is reached, the wheel will turn. The pressure indicated on the dial will suffice to enable the user to determine how much pressure is necessary to rotate this wheel.

Of course, in making this wheel test to determine brake pressure, it is necessary that the brake pedal (not shown) be held down, either by a mechanical device, or another attendant. In other words, the brakes are applied while the testing device just described is used.

Under this arrangement, and by skillful handling, it is possible to compare the relative turning pressures of the wheels in a systematic manner for checking the brakes and making subsequent adjustments whenever necessary.

The essential factors of the invention are as follows. A suitable mechanical device must be provided for application to the wheel in such a way as to grip the wheel, and this device should include, in accordance with the present inventive conception, an element to accommodate the wrench so as to permit the wheel attached device to turn with the wrench at a predetermined pressure.

The wrench is gauge-equipped, that is, provided itself with a gauge, said gauge being mounted on one part and operatively connected to the lever, and the lever being pivotally connected with the first named part, which itself is so constructed as to permit it to be detachably connected with the device which is fastened on the wheel.

It is thought that the description, taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to in actual practice if desired, without departing from the spirit and scope of the appended claims.

I claim:

1. In an appliance of the class described, a hub shield comprising a bell-shaped plate having a marginal apertured flange and a centralized thickened portion formed with a polygonal socket, and a multiplicity of adjustable wheel embracing chains connected with the apertured portion of said flange.

2. In an appliance of the class described, a hub shield comprising a bell shaped plate having a marginal apertured flange and a centralized thickened portion formed with a socket, a multiplicity of adjustable wheel-embracing chains connected with the apertured portion of said flange, and a wrench comprising a shank and a head, and adapted to be inserted in said socket, a gauge carried by said shank, and a lever pivotally mounted on the shank and operatively connected to the gauge.

In testimony whereof I affix my signature.

CHARLES HALL.